(12) United States Patent
Ishii et al.

(10) Patent No.: US 11,715,031 B2
(45) Date of Patent: Aug. 1, 2023

(54) INFORMATION PROCESSING METHOD AND INFORMATION PROCESSING SYSTEM FOR REDUCING A DIFFERENCE BETWEEN OUTPUT DATA OF A FIRST LEARNING MODEL AND OUTPUT DATA OF A SECOND LEARNING MODEL

(71) Applicant: Panasonic Intellectual Property Corporation of America, Torrance, CA (US)

(72) Inventors: Yasunori Ishii, Osaka (JP); Yohei Nakata, Osaka (JP); Hiroaki Urabe, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 929 days.

(21) Appl. No.: 16/529,102

(22) Filed: Aug. 1, 2019

(65) Prior Publication Data
US 2020/0050943 A1 Feb. 13, 2020

(30) Foreign Application Priority Data

Aug. 9, 2018 (JP) .................................. 2018-150393
Mar. 15, 2019 (JP) .................................. 2019-048768

(51) Int. Cl.
*G06N 20/00* (2019.01)
*G06N 20/20* (2019.01)
(Continued)

(52) U.S. Cl.
CPC ............. *G06N 20/00* (2019.01); *G06N 3/045* (2023.01); *G06N 3/08* (2013.01); *G06N 20/20* (2019.01);
(Continued)

(58) Field of Classification Search
CPC ...... G06N 20/00; G06N 20/20; G06N 3/0454; G06N 3/08; G06N 3/084
See application file for complete search history.

(56) References Cited

U.S. PATENT DOCUMENTS 5,103,496 A * 4/1992 Andes .................... G06N 3/063
706/39
10,984,286 B2 * 4/2021 Dundar ................... G06T 15/00
(Continued)

FOREIGN PATENT DOCUMENTS

WO 2017/074966 5/2017

OTHER PUBLICATIONS

Chai et al., "Application Development Platform and Software Development Kits that Provide Comprehensive Machine Learning Services" May 7, 2018, U.S. Appl. No. 62/667,959. (Year: 2018).*

(Continued)

*Primary Examiner* — Miranda M Huang
*Assistant Examiner* — Chase P. Hinckley
(74) *Attorney, Agent, or Firm* — Wenderoth, Lind & Ponack, L.L.P.

(57) ABSTRACT

An information processing method includes acquiring first output data for input data of first learning model, reference data for the input data, and second output data for the input data of second learning model obtained by converting first learning model; calculating first difference data corresponding to a difference between the first difference data and the reference data and second difference data corresponding to a difference between the second output data and the reference data; and training first learning model with use of the first difference data and the second difference data.

2 Claims, 7 Drawing Sheets

(51) Int. Cl.
*G06N 3/08* (2023.01)
*G06N 3/045* (2023.01)
*G06N 3/084* (2023.01)
*G06F 9/30* (2018.01)

(52) U.S. Cl.
CPC .......... *G06F 9/30014* (2013.01); *G06N 3/084* (2013.01)

(56) References Cited

U.S. PATENT DOCUMENTS

| | | | | |
|---|---|---|---|---|
| 11,315,019 | B2* | 4/2022 | Nachum | G06N 20/00 |
| 2003/0036903 | A1* | 2/2003 | Konopka | G10L 15/065 704/E15.009 |
| 2010/0161230 | A1* | 6/2010 | Chu | G01V 1/32 702/14 |
| 2018/0121791 | A1* | 5/2018 | O'Connor | G06N 3/049 |
| 2018/0314881 | A1* | 11/2018 | Sud | G06V 10/764 |
| 2019/0138889 | A1* | 5/2019 | Jiang | G06T 7/251 |
| 2019/0297326 | A1* | 9/2019 | Reda | G06N 20/10 |
| 2019/0340499 | A1* | 11/2019 | Burger | G06N 3/063 |
| 2019/0354842 | A1* | 11/2019 | Louizos | G06N 3/0454 |
| 2020/0167654 | A1* | 5/2020 | Guo | G06N 3/0427 |
| 2022/0091837 | A1* | 3/2022 | Chai | G06F 8/36 |

OTHER PUBLICATIONS

Reda et al., "Video Prediction Using Spatially Displaced Convolution" Mar. 21, 2018, U.S. Appl. No. 62/646,309. (Year: 2018).*
Tan et al., "MnasNet: Platform-Aware Neural Architecture Search for Mobile" Jul. 31, 2018, arXiv: 1807.1162v1, pp. 1-9. (Year: 2018).*
Belagiannis et al., "Adversarial Network Compression" Mar. 28, 2018, arXiv: 1803.10750v1, pp. 1-17. (Year: 2018).*
Krishnamoorthi, Raghuraman "Quantizing deep convolutional networks for efficient inference: A whitepaper" Jun. 21, 2018, arXiv: 1806.08342v1, pp. 1-36. (Year: 2018).*
Yang et al., "NetAdapt: Platform-Aware Neural Network Adaptation for Mobile Applications" Apr. 9, 2018, arXiv: 1804.03230v1, pp. 1-16. (Year: 2018).*
Hou et Kwok, "Loss-Aware Weight Quantization of Deep Networks" May 10, 2018, arXiv: 1802.08635v2, pp. 1-16. (Year: 2018).*
Zhang et al., "LQ-Nets: Learned Quantization for Highly Accurate and Compact Deep Neural Networks" Jul. 26, 2018, arXiv: 1807.10029v1, pp. 1-21. (Year: 2018).*
Chen et al., "Learning K-way D-dimensional Discrete Codes for Compact Embedding Representations" Jun. 21, 2018, arXiv: 1806.09464v1. (Year: 2018).*
He et Han, "ADC: Automated Deep Compression and Acceleration with Reinforcement Learning" Feb. 10, 2018, arXiv: 1802.03494v1, pp. 1-12. (Year: 2018).*
Polino et al., "Model Compression via Distillation and Quantization" Feb. 15, 2018, arXiv: 1802.05668v1, pp. 1-21. (Year: 2018).*
Narang et al., "Mixed Precision Training" Feb. 15, 2018, arXiv: 1710.03740v3, pp. 1-12. (Year: 2018).*
Das et al., "Mixed Precision Training of Convolutional Neural Networks Using Integer Operations" Feb. 23, 2018, arXiv: 1802.00930v2, pp. 1-11. (Year: 2018).*
Loroch et al., "TensorQuant—A Simulation Toolbox for Deep Neural Network Quantization" Oct. 13, 2017, arXiv: 1710.05758v1, pp. 1-10. (Year: 2017).*
Extended European Search Report dated Jan. 20, 2020 in corresponding European Patent Application No. 19189952.5.
Benoit Jacob, et al., "Quantization and Training of Neural Networks for Efficient Integer-Arithmetic-Only Inference", https://arxiv.org/abs/1712.05877, Submitted on Dec. 15, 2017.

* cited by examiner

INFORMATION PROCESSING METHOD AND INFORMATION PROCESSING SYSTEM FOR REDUCING A DIFFERENCE BETWEEN OUTPUT DATA OF A FIRST LEARNING MODEL AND OUTPUT DATA OF A SECOND LEARNING MODEL

BACKGROUND

1. Technical Field

The present disclosure relates to information processing methods and information processing systems for obtaining learning models through machine learning.

2. Description of the Related Art

To date, in one known technique, a second learning model suitable for a second computer environment is generated, with use of a conversion tool, from a first learning model trained in a first arithmetic processing environment, and the generated second learning model is used in a second arithmetic processing environment.

For example, Quantization and Training of Neural Networks for Efficient Integer-Arithmetic-Only Inference. https://arxiv.org/abs/1712.05877 (Non-Patent Literature 1) describes a technique for reducing such a difference between output data of a first learning model and output data of a second learning model that arises when identical data is input to the first learning model and the second learning model converted from the first learning model with use of a conversion tool.

SUMMARY

The above-described existing technique, however, cannot be used when the content of the conversion process of the conversion tool that converts the first learning model to the second learning model is unknown (i.e., when the conversion tool is a black box).

Accordingly, the present disclosure is directed to providing an information processing method and an information processing system that, even when the content of a conversion process of a conversion tool that converts a first learning model to a second learning model is unknown, can reduce such a difference between output data of the first learning model and output data of the second learning model that arises when identical data is input to the first learning model and the second learning model.

An information processing method according to an aspect of the present disclosure comprises, executed by one or more computers, acquiring first output data for input data of a first learning model, reference data for the input data, and second output data for the input data of a second learning model obtained by converting the first learning model; calculating first difference data corresponding to a difference between the first output data and the reference data and second difference data corresponding to a difference between the second output data and the reference data; and training the first learning model with use of the first difference data and the second difference data.

An information processing system according to an aspect of the present disclosure comprises an acquiring unit that acquires first output data for input data of a first learning model, reference data for the input data, and second output data for the input data of a second learning model obtained by converting the first learning model; a calculating unit that calculates first difference data corresponding to a difference between the first output data and the reference data and second difference data corresponding to a difference between the second output data and the reference data; and a training unit that trains the first learning model with use of the first difference data and the second difference data.

With an information processing method and an information processing system according to one aspect of the present disclosure, even when the content of a conversion process of a conversion tool that converts a first learning model to a second learning model is unknown, it is possible to reduce such a difference between output data of the first learning model and output data of the second learning model that arises when identical data is input to the first learning model and the second learning model.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS (Underlying Knowledge Forming Basis of One Aspect of the Present Disclosure)

In recent years, in in-vehicle embedded systems, such as an advanced driver-assistance system (ADAS) and an autonomous driving system, a recognition system that uses machine learning needs to make an inference through a learning model.

Typically, a learning model applied to an in-vehicle embedded system is generated as follows. A conversion tool is applied to a first learning model obtained through training in a computer system with higher capabilities than the in-vehicle embedded system, and the first learning model is thus converted to a second learning model suitable for the in-vehicle embedded system.

For example, a first learning model that is trained through a floating-point arithmetic process in a personal computer and that makes an inference in floating-point arithmetic is converted to a second learning model that performs an integer arithmetic process in an in-vehicle embedded system, and thus a learning model to be applied to the in-vehicle embedded system is generated.

The process of the first learning model and the process of the second learning model are not necessarily exactly the same. Therefore, even when identical data is input to the first learning model and the second learning model, a difference may arise between an output of the first learning model and an output of the second learning model.

When the content of a conversion process of a conversion tool that converts the first learning model to the second learning model is open to the public, the aforementioned difference can be reduced with use of the technique described in Non-Patent Literature 1, for example. However, when the content of the conversion process of the conversion tool that converts the first learning model to the second learning model is unknown, the technique described in Non-Patent Literature 1 cannot be used.

In view of such a problem, the inventor has conceived of an information processing method and an information processing system described below.

An information processing method according to an aspect of the present disclosure includes, executed by one or computers, acquiring first output data for input data of a first learning model, reference data (hereafter also referred to as correct data) for the input data, and second output data for the input data of a second learning model obtained by converting the first learning model; calculating first difference data corresponding to a difference between the first output data and the correct data and second difference data corresponding to a difference between the second output data and the correct data; and training the first learning model with use of the first difference data and the second difference data.

According to the foregoing information processing method, the first learning model is trained with use of, in addition to the first difference data, the second difference data as well. In the training of the first learning model, the content of a conversion process of a conversion tool that converts the first learning model to the second learning model need not be reflected. Accordingly, with the foregoing information processing method, even when the content of the conversion process of the conversion tool that converts the first learning model to the second learning model is unknown, it is possible to reduce such a difference between the output data of the first learning model and the output data of the second learning model that arises when identical data is input to the first learning model and the second learning model.

The training may include weighting the first difference data and the second difference data. This enables training with a difference between the degree by which an output of the first learning model is given importance and the degree by which an output of the second learning model is given importance in the training of the first learning model.

The first difference data may be given a weight greater than a weight of the second difference data in the weighting. This enables training with greater importance given to an output of the first learning model than to an output of the second learning model in the training of the first learning model. In other words, the characteristics (or performance) of the first learning model can be kept from approaching too close to the characteristics (performance) of the second learning model.

The training may further include using a difference between the first difference data and the second difference data. This enables training in consideration of a difference between an output of the first learning model and an output of the second learning model in the training of the first learning model. It can be said that the smaller the difference between these two pieces of difference data, the closer the characteristics (or performance) of the first learning model and the characteristics (or performance) of the second learning model. Accordingly, training for reducing the difference between the output data of the first learning model and the output data of the second learning model can be performed with high efficiency.

The training may include weighting the first difference data, the second difference data, and a difference between the first difference data and the second difference data. This enables training with a difference among the degree by which an output of the first learning model is given importance, the degree by which an output of the second learning model is given importance, and the degree by which the difference between the output of the first learning model and the output of the second learning model is given importance in the training of the first learning model.

The first learning model and the second learning model may each be a neural network learning model. This allows the first learning model and the second learning model to be implemented by a relatively well-known mathematical model.

An information processing system according to an aspect of the present disclosure includes an acquiring unit that acquires first output data for input data of a first learning model, correct data for the input data, and second output data for the input data of a second learning model obtained by converting the first learning model; a calculating unit that calculates first difference data corresponding to a difference between the first output data and the correct data and second difference data corresponding to a difference between the second output data and the correct data; and a training unit (also referred to here as learning unit) that trains the first learning model with use of the first difference data and the second difference data.

According to the foregoing information processing system, the first learning model is trained with use of, in addition to the first difference data, the second difference data as well. In the training of the first learning model, the content of a conversion process of a conversion tool that converts the first learning model to the second learning model need not be reflected. Accordingly, with the foregoing information processing system, even when the content of the conversion process of the conversion tool that converts the first learning model to the second learning model is unknown, it is possible to reduce such a difference between the output data of the first learning model and the output data of the second learning model that arises when identical data is input to the first learning model and the second learning model.

Hereinafter, specific examples of an information processing method and an information processing system according to an aspect of the present disclosure will be described with reference to the drawings. The embodiments described herein each illustrate a specific example of the present disclosure. Therefore, the numerical values, the shapes, the constituent elements, the arrangement and the connection modes of the constituent elements, the steps, the order of the steps, and so on illustrated in the following embodiments are examples and are not intended to limit the present disclosure. Among the constituent elements in the following embodiments, any constituent element that is not described in independent claims is a constituent element that can be added optionally. Each drawing is a schematic diagram and does not necessarily provide an exact depiction.

General or specific aspects of the present disclosure may be implemented in the form of a system, a method, an integrated circuit, a computer program, or a computer-readable recording medium, such as a CD-ROM, or through any desired combination of a system, a method, an integrated circuit, a computer program, and a recording medium.

Embodiment 1

First, an information processing system according to Embodiment 1 will be described. This information processing system converts a first learning model that performs a floating-point arithmetic process to a second learning model that performs an integer arithmetic process. The information processing system retrains the first learning model so as to reduce such a difference between output data of the first learning model and output data of the second learning model that arises when identical data is input to the first learning model and the second learning model.

1-1. Configuration of Information Processing System

Figure 1:
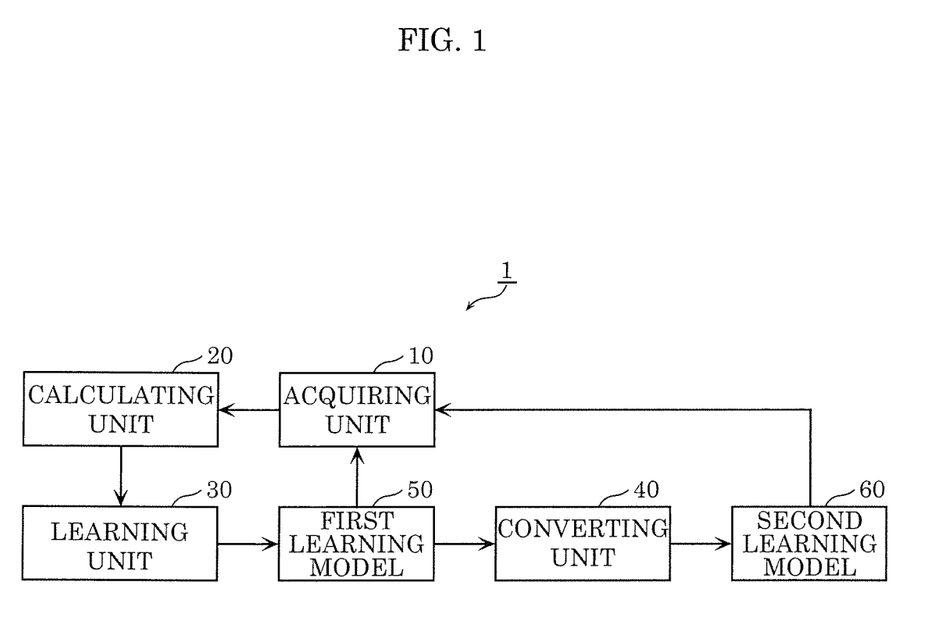
FIG. 1 is a block diagram illustrating a configuration of an information processing system according to Embodiment 1.

FIG. 1 is a block diagram illustrating a configuration of information processing system 1 according to Embodiment 1.

As illustrated in FIG. 1, information processing system 1 includes acquiring unit 10, calculating unit 20, learning unit (training unit) 30, converting unit 40, first learning model 50, and second learning model 60.

Information processing system 1 may be implemented by a personal computer that includes a processor and a memory, for example. In this case, each constituent element of information processing system 1 may be implemented as the processor executes one or more programs stored in the memory, for example. Information processing system 1 may also be implemented through cooperation of a plurality of computer devices that each include a processor and a memory and that can communicate with each other, for example. In this case, each constituent element of information processing system 1 may be implemented as any one or more processors execute one or more programs stored in any one or more memories, for example.

First learning model 50 is a machine learning model that performs a process with use of a floating-point variable. Herein, first learning model 50 is a neural network learning model and is described as a human recognizer that has been trained to recognize, from an image, a human included as a subject in that image. First learning model 50, upon having received an image as input data, outputs the coordinates indicating the position of a recognized human and the reliability of that human as output data, for example.

Second learning model 60 is a machine learning model so converted from first learning model 50 by converting unit 40, described later, as to perform a process with use of an integer variable. Like first learning model 50, second learning model 60 is a neural network learning model and is described as a human recognizer that recognizes, from an image, a human included as a subject in that image. Like first learning model 50, second learning model 60, upon having received an image as input data, outputs the coordinates indicating the position of a recognized human and the reliability of that human as output data, for example.

While second learning model 60 performs a process with lower numerical arithmetic precision than first learning model 50, second learning model 60 can be used even in a system that cannot deal with a floating-point variable, that is, even in a system that cannot use first learning model 50.

For example, in an in-vehicle embedded system that is relatively short on computer resources and that cannot deal with a floating-point variable but can deal with an integer variable, first learning model 50 cannot be used, but second learning model 60 can be used.

Second learning model 60 is suitable for use in a system in which reduction in the power consumption associated with arithmetic is given greater importance than the arithmetic precision, for example.

Converting unit 40 converts first learning model 50 that performs a process with use of a floating-point variable to second learning model 60 that performs a process with use of an integer variable.

Figure 2:
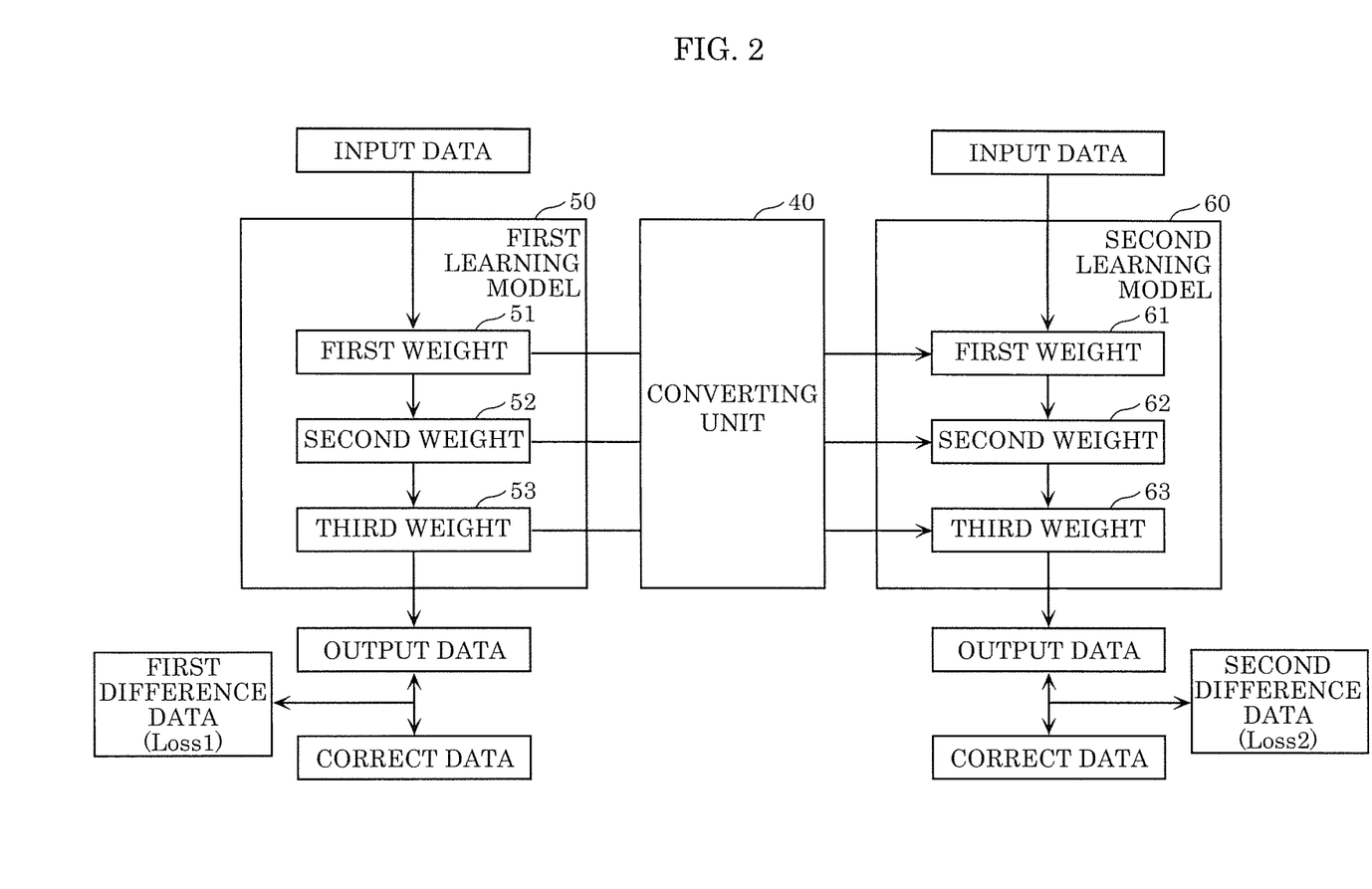
FIG. 2 is a schematic diagram illustrating an example of how a converting unit according to Embodiment 1 converts a first learning model to a second learning model.

FIG. 2 is a schematic diagram illustrating an example of how converting unit 40 converts first learning model 50 to second learning model 60.

As illustrated in FIG. 2, when first learning model 50 includes a plurality of weights (herein, first weight 51, second weight 52, and third weight 53, for example) that are stratified and that each perform a process with use of a floating-point variable, converting unit 40 converts the plurality of weights that each perform a process with use of a floating-point variable to respective weights (herein, first weight 61, second weight 62, and third weight 63, for example) that each perform a process with use of an integer variable.

First learning model 50 performs a process with use of a floating-point variable, and second learning model 60 performs a process with use of an integer variable. Therefore, even when identical image A is input to first learning model 50 and second learning model 60, output data A1 from first learning model 50 and output data A2 from second learning model 60 do not necessarily match. In other words, with reference data (correct data) obtained when the input data is image A being regarded as correct data A, a difference may arise between first difference data (described later) corresponding to a difference between output data A1 and correct data A and second difference data (described later) corresponding to a difference between output data A2 and correct data A.

Referring back to FIG. 1, the description of the configuration of information processing system 1 will continue.

Acquiring unit 10 acquires first output data for input data input to first learning model 50, second output data for this input data input to second learning model 60, and correct data for this input data.

From the first output data, the second output data, and the correct data acquired by acquiring unit 10, calculating unit 20 calculates first difference data (the first difference data may also be referred to below as "Loss1" in expressions and so on) corresponding to a difference between the first output data and the correct data and second difference data (the second difference data may also be referred to below as "Loss2" in expressions and so on) corresponding to a difference between the second output data and the correct data.

Herein, in one example that is not necessarily limiting, the first difference data (Loss1) is an L2 norm between the correct data and the first output data calculated in accordance with expression (1) below.

$$Loss1 = \|correct\ data - first\ output\ data\|^2 \qquad (1)$$

In one example that is not necessarily limiting, the second difference data (Loss2) is an L2 norm between the correct data and the second output data calculated in accordance with expression (2) below.

$$Loss2 = \|correct\ data - second\ output\ data\|^2 \qquad (2)$$

Learning unit 30, which is an example of a training unit, retrains first learning model 50 with use of the first difference data and the second difference data.

Figure 3:
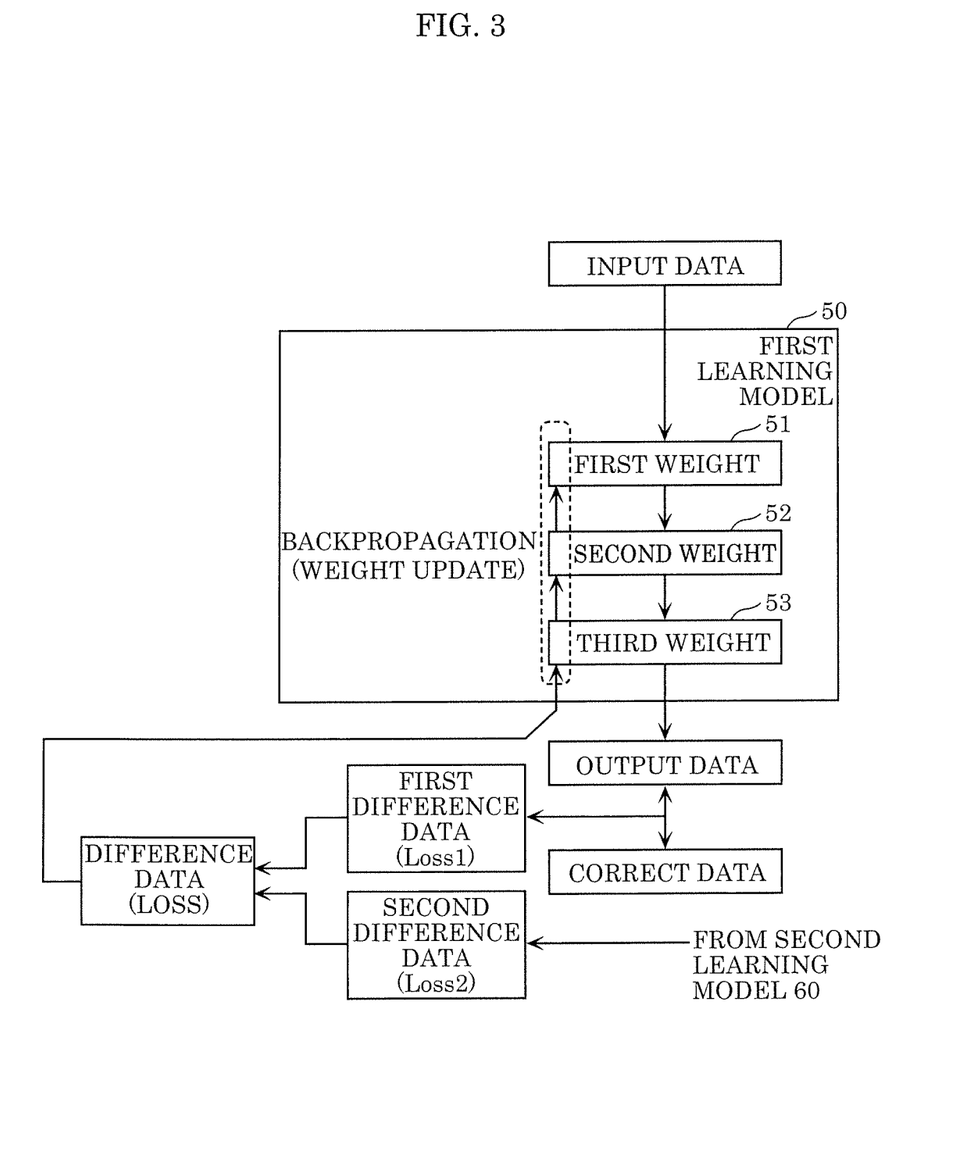
FIG. 3 is a schematic diagram illustrating an example of how a learning unit according to Embodiment 1 retrains a first learning model.

FIG. 3 is a schematic diagram illustrating an example of how learning unit 30 retrains first learning model 50.

As illustrated in FIG. 3, learning unit 30 calculates difference data (the difference data may also be referred to below as "LOSS" in expressions and so on) expressed by expression (3) from the first difference data and the second difference data. The correct data, the first output data, and the second output data for calculating the first difference data and the second difference data may be normalized by the output data count.

$$LOSS = \lambda_1 * Loss_1 + \lambda_2 * Loss_2 + \lambda_3 * \|Loss_1 - Loss_2\| \quad (3)$$

In the above, $\lambda_1$, $\lambda_2$, and $\lambda_3$ are numerical values by which the first difference data, the second difference data, and the difference between the first difference data and the second difference data are given weights in the calculation of the difference data and are in a relationship that satisfies expressions (4) to (7) below.

$$\lambda_1 + \lambda_2 + \lambda_3 = 1 \quad (4)$$

$$1 > \lambda_1 > 0 \quad (5)$$

$$1 > \lambda_2 > 0 \quad (6)$$

$$1 > \lambda_3 \geq 0 \quad (7)$$

As illustrated in FIG. 3, upon having calculated the difference data, learning unit 30 updates the weights through backpropagation in which the calculated difference data serves as an error and thus retrains first learning model 50.

The inventor has conducted experiments iteratively on retraining of first learning model 50 by learning unit 30 with varied combinations of values of $\lambda_1$, $\lambda_2$, and $\lambda_3$ in expression (3) for calculating the difference data. As a result, the inventor has found the following. In order to reduce the difference between the output data of the first learning model and the output data of the second learning model, it is preferable that $\lambda_1$ be greater than $\lambda_2$. Specifically, when the weights are given to the first difference data, the second difference data, and the difference between the first difference data and the second difference data in the calculation of the difference data, it is preferable that the first difference data be given a weight greater than a weight of the second difference data. A conceivable explanation for this is as follows. As first learning model 50 is retrained with greater importance given to the output of first learning model 50 that performs a process with higher numerical arithmetic precision than to the output of second learning model 60 that performs a process with lower numerical arithmetic precision, the difference between the output data of the first learning model and the output data of the second learning model can be reduced with higher accuracy.

1-2. Operation of Information Processing System

A process performed by information processing system 1 having the foregoing configuration will be described below.

Information processing system 1 performs a first updating process of learning models for updating first learning model 50 and second learning model 60 with use of the first difference data and the second difference data.

Figure 4:
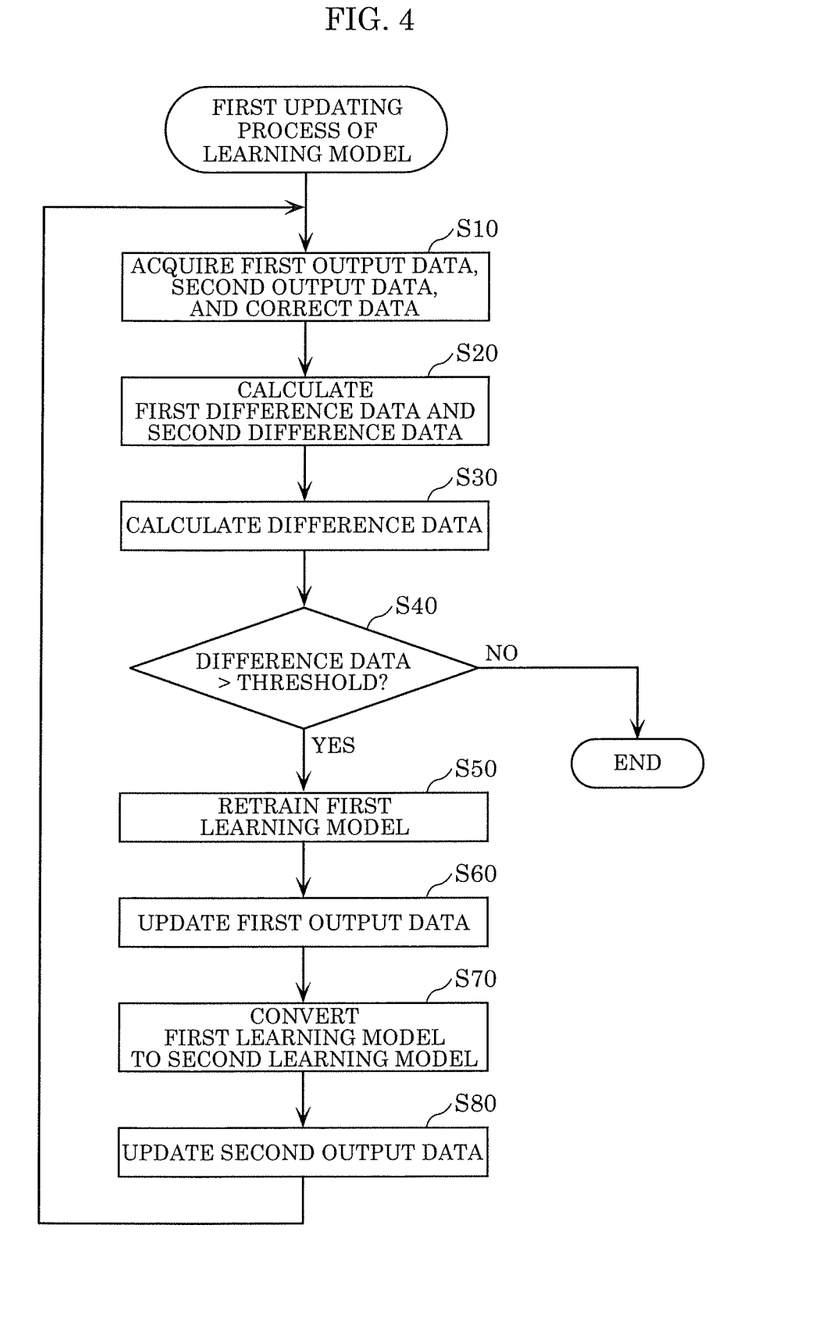
FIG. 4 is a flowchart of a first updating process of learning models according to Embodiment 1.

FIG. 4 is a flowchart of the first updating process of learning models.

The first updating process of the learning models is started upon a user of information processing system 1 operating information processing system 1 to execute the first updating process of the learning models after first learning model 50 and second learning model 60 have output, respectively, the first output data and the second output data for one piece of input data, for example.

When the first updating process of the learning models is started and when a process in step S80 described later is finished, acquiring unit 10 acquires the first output data for one piece of input data, the second output data for the one piece of input data, and the correct data for the one piece of input data (step S10).

Upon acquiring unit 10 having acquired the first output data, the second output data, and the correct data, calculating unit 20, from the acquired first output data, second output data, and correct data, calculates the first difference data corresponding to the difference between the first output data and the correct data through expression (1) and calculates the second difference data corresponding to the difference between the second output data and the correct data through expression (2) (step S20).

Upon the first difference data and the second difference data having been calculated, learning unit 30 calculates the difference data from the first difference data and the second difference data through expression (3) (step S30). Then, learning unit 30 determines whether the calculated difference data is greater than a predetermined threshold (step S40).

When the calculated difference data is greater than the predetermined threshold in the process of step S40 (step S40: Yes), learning unit 30 updates the weights through backpropagation in which the calculated difference data serves as an error to thus retrain first learning model 50 (step S50). Then, first learning model 50 that has been retrained updates the first output data for the one piece of input data (step S60).

Upon the first output data having been updated, converting unit 40 converts first learning model 50 that has been retrained to second learning model 60 (step S70). Then, converted second learning model 60 updates the second output data for the one piece of input data (step S80).

Upon the process in step S80 having finished, information processing system 1 returns to the process in step S10 and repeats the processes in step S10 and thereafter.

When the calculated difference data is not greater than the predetermined threshold in the process of step S40 (step S40: No), information processing system 1 terminates the first updating process of the learning models.

1-3. Discussion

As described above, with information processing system 1, first learning model 50 is retrained with use of, in addition to the first difference data, the second difference data from second learning model 60. In retraining of first learning model 50, the content of the conversion process from first learning model 50 to second learning model 60 need not be reflected. Accordingly, with information processing system 1, even when the content of the conversion process from first learning model 50 to second learning model 60 is unknown, it is possible to reduce such a difference between the output data of first learning model 50 and the output data of second learning model 60 that arises when identical data is input to first learning model 50 and second learning model 60.

Embodiment 2

Next, an information processing system according to Embodiment 2 will be described. Descriptions of configurations identical to those of Embodiment 1 will be omitted.

2-1. Configuration of Information Processing System

Figure 5:
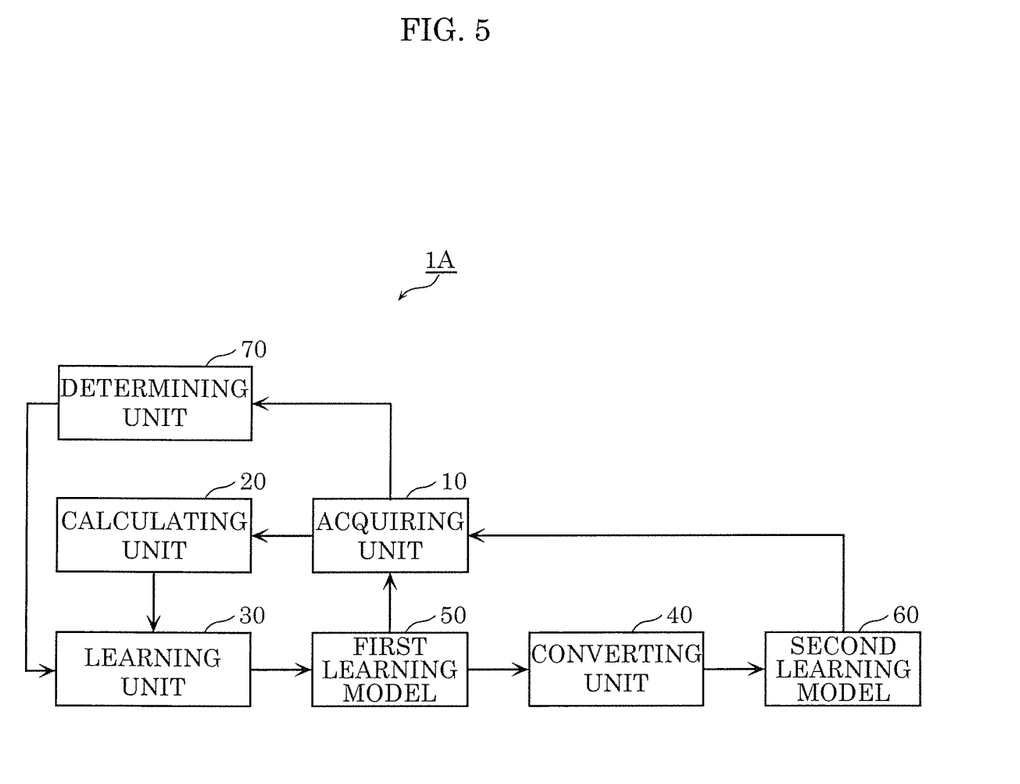
FIG. 5 is a block diagram illustrating a configuration of an information processing system according to Embodiment 2.

FIG. 5 is a block diagram illustrating a configuration of information processing system 1A according to Embodiment 2.

As illustrated in FIG. 5, information processing system 1A includes acquiring unit 10, calculating unit 20, learning unit (training unit) 30, converting unit 40, first learning model 50, second learning model 60, and determining unit 70.

Figure 6:
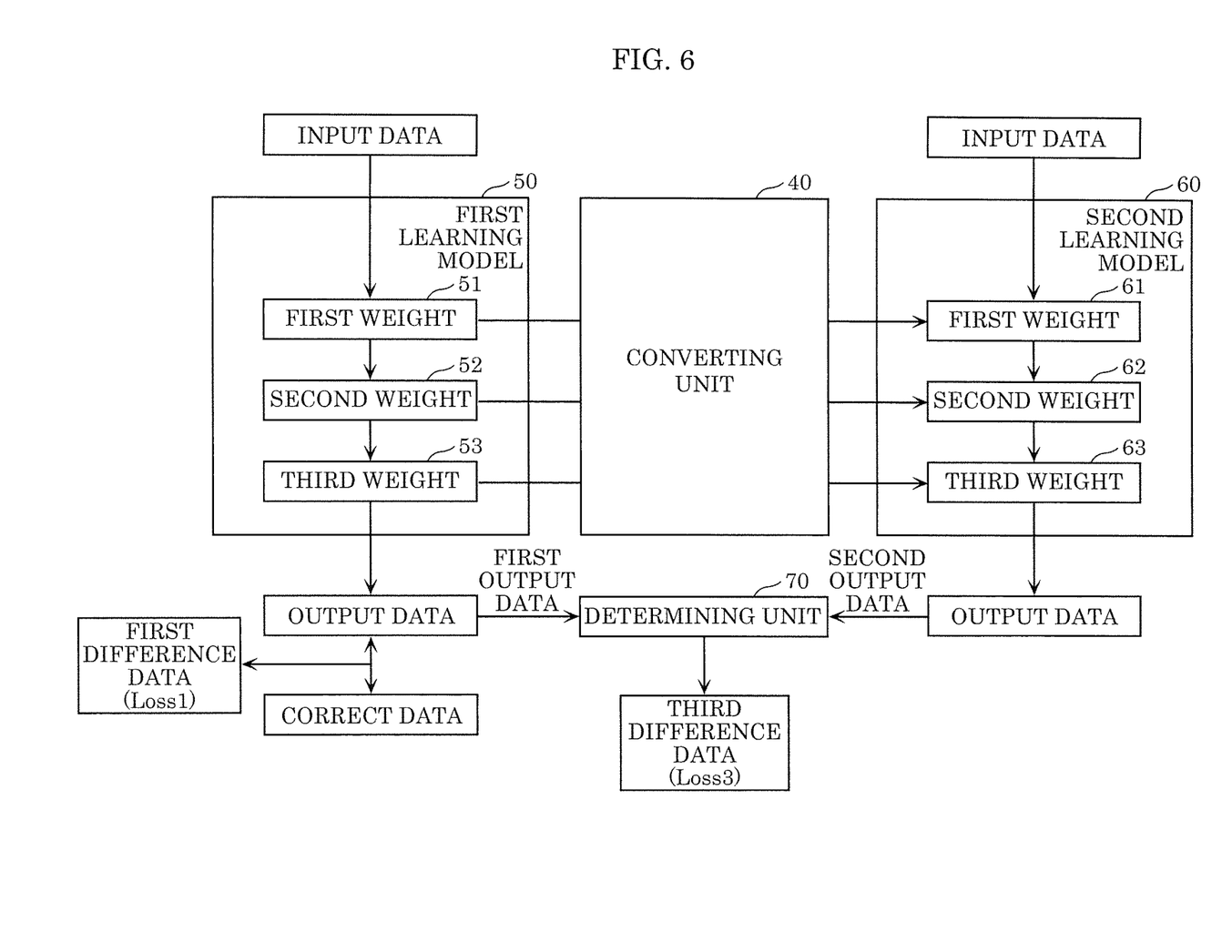
FIG. 6 is a schematic diagram illustrating an example of how data for retraining a first learning model is generated in an information processing system according to Embodiment 2.

As illustrated in FIG. 6, determining unit 70 generates third difference data with use of first output data and second output data. Specifically, determining unit 70 determines whether each of the first output data and the second output data is true data. Then, determining unit 70 generates the third difference data on the basis of the determination result. For example, determining unit 70 is a discriminator in the generative adversarial network (GAN). Determining unit 70 generates, as the determination result, a first probability that the first output data is true data (or a probability that the first output data is false data) and a second probability that the second output data is true data (or a probability that the second output data is false data). Then, determining unit 70 generates the third difference data with use of the first probability and the second probability. For example, the third difference data is calculated in accordance with expression (8) below.

$$\text{Loss3}=\log(D(\text{first output data}))+\log(1-D(\text{second output data})) \quad (8)$$

In the above, D represents a discriminator. In the above expression, determining unit 70 (i.e., discriminator) generates a probability that the first output data and the second output data are true data.

Learning unit 30 retrains first learning model 50 with use of the first difference data and the third difference data.

Learning unit 30 calculates difference data (i.e., LOSS) expressed by expression (9) below from the first difference data and the third difference data.

$$\text{LOSS}=\lambda 4*\text{Loss1}+\lambda 5*\text{Loss3} \quad (9)$$

In the above, $\lambda 4$ and $\lambda 5$ are numerical values with which the first difference data and the third difference data are given weights in the calculation of the difference data.

Learning unit 30 updates the weights through backpropagation in which the calculated difference data serves as an error and thus retrains first learning model 50.

2-2. Operation of Information Processing System

Figure 7:
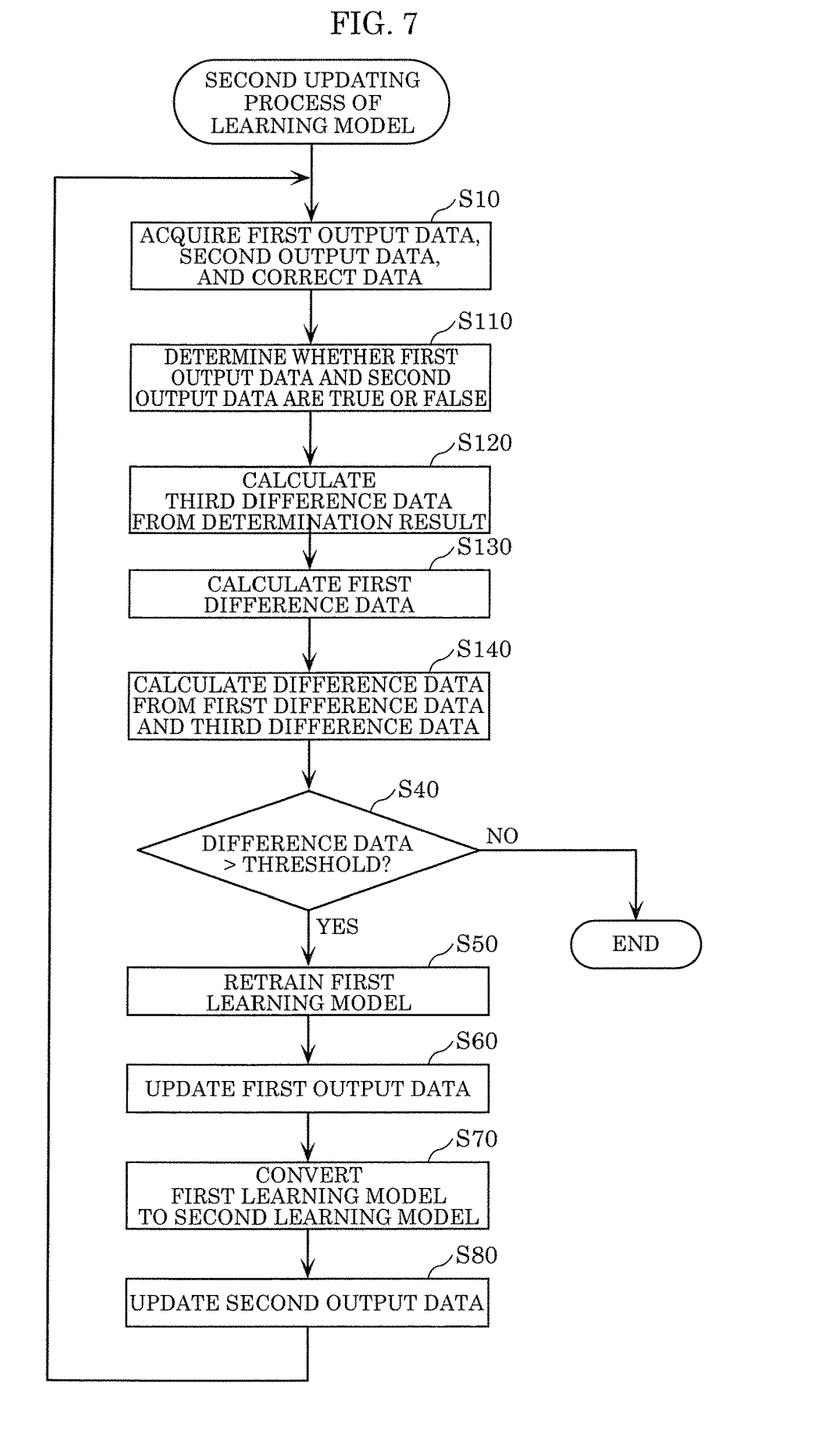
FIG. 7 is a flowchart of a second updating process of learning models according to Embodiment 2.

A process performed by information processing system 1A having the foregoing configuration will be described below. FIG. 7 is a flowchart of a second updating process of learning models.

First, acquiring unit 10 acquires first output data for one piece of input data, second output data for the one piece of input data, and reference data (correct data) for the one piece of input data (step S10).

Upon acquiring unit 10 having acquired the first output data and the second output data, determining unit 70 determines whether the acquired first output data and second output data are true or false (step S110). For example, determining unit 70 calculates the probability that the first output data is true data and the probability that the second output data is true data.

Determining unit 70 calculates third difference data from the determination result (step S120). For example, determining unit 70 calculates the third difference data through expression (8) above.

Calculating unit 20 calculates first difference data from the acquired first output data and correct data (step S130).

Learning unit 30 calculates difference data from the calculated first difference data and third difference data (step S140). For example, learning unit 30 calculates the difference data through expression (9) above.

The processes thereafter are substantially identical to the processes in Embodiment 1, and thus descriptions thereof will be omitted.

2-3. Discussion

In this manner, with information processing system 1A according to Embodiment 2, first learning model 50 is retrained with use of, in addition to the first difference data, the third difference data for bringing the first output data and the second output data closer to each other. Executing training of first learning model 50 so as to bring the second output data closer to the first output data can bring the recognition performance of second learning model 60 closer to that of first learning model 50. Accordingly, even when the content of the conversion process from first learning model 50 to second learning model 60 is unknown, it is possible to reduce such a difference between the output data of first learning model 50 and the output data of second learning model 60 that arises when identical data is input to first learning model 50 and second learning model 60.

Furthermore, the use of the first difference data as well in retraining of first learning model 50 can suppress deterioration in the performance of first learning model 50 (i.e., deterioration in the performance of second learning model 60) while the recognition performance of second learning model 60 is being brought closer to the recognition performance of first learning model 50.

Other Embodiments

Thus far, an information processing system according to one or more aspects of the present disclosure has been described on the basis of Embodiment 1 and Embodiment 2, but the present disclosure is not limited by these embodiments. Unless departing from the spirit of the present disclosure, an embodiment obtained by making various modifications conceivable by a person skilled in the art to the present embodiments or an embodiment constructed by combining constituent elements in different embodiments may also be included within the scope of one or more aspects of the present disclosure.

(1) In Embodiment 1, first learning model 50 performs a process with use of a floating-point variable, and second learning model 60 performs a process with use of an integer variable. However, as long as second learning model 60 is obtained by converting first learning model 50, it is not necessarily limited that first learning model 50 performs a process with use of a floating-point variable and second learning model 60 performs a process with use of an integer variable.

In one example, first learning model 50 may treat a pixel value of each pixel in an image to be dealt with as quantized 8-bit RGB data, and second learning model 60 may treat a pixel value of each pixel in an image to be dealt with as quantized 4-bit RGB data. In this case, second learning model 60 can be used even in a system that cannot deal with an image composed of RGB data having a pixel value of 8 bits due to a constraint on the data transfer rate of data to be dealt with, a constraint on the storage capacity for storing the data to be dealt with, and so on, for example, but can deal with an image composed of RGB data having a pixel value of 4 bits. In addition, in the above case, in a system in which reduction in the power consumption associated with arithmetic is given greater importance than the arithmetic precision, for example, it may be more suitable to use second learning model 60 than first learning model 50.

In another example, first learning model 50 may perform a process with use of a 32-bit floating-point variable, and second learning model 60 may perform a process with use of a 16-bit floating-point variable. In this case, second learning model 60 can be used even in a system that cannot deal with a 32-bit floating-point variable but can deal with a 16-bit floating-point variable, for example. In addition, in the above case, in a system in which reduction in the power consumption associated with arithmetic is given greater importance than the arithmetic precision, for example, it may be more suitable to use second learning model 60 than first learning model 50.

In yet another example, first learning model 50 may treat a pixel value of each pixel in an image to be dealt with as RGB color space data, and second learning model 60 may treat a pixel value of each pixel in an image to be dealt with as YCbCr color space data. In this case, second learning model 60 can be used even in a system that cannot treat a pixel value of each pixel in an image to be dealt with as RGB color space data but can treat such a pixel value as YCbCr color space data.

(2) Part of whole of the constituent elements included in information processing system 1 may be constituted by a single system large-scale integration (LSI). A system LSI is an ultra-multifunctional LSI manufactured by integrating a plurality of components on a single chip and is specifically a computer system including a microprocessor, a read-only memory (ROM), a random-access memory (RAM), and so on. The ROM stores a computer program. The microprocessor operates in accordance with the computer program, and thus the system LSI implements its functions.

Although a system LSI is illustrated above, depending on the difference in the degree of integration, it may also be called an IC, an LSI, a super LSI, or an ultra LSI. The technique for circuit integration is not limited to an LSI, and an integrated circuit may be implemented by a dedicated circuit or a general-purpose processor. A field-programmable gate array (FPGA) that can be programmed after an LSI is manufactured or a reconfigurable processor in which the connection or the setting of the circuit cells within an LSI can be reconfigured may also be used.

Furthermore, if a technique for circuit integration that replaces an LSI appears through the advancement in the semiconductor technology or from derived different technology, the functional blocks may be integrated with use of such a different technique. An application of biotechnology, for example, is a possibility.

(3) An aspect of the present disclosure is not limited to the foregoing information processing system and may be an information processing method with steps served by characteristic components included in the information processing system. An aspect of the present disclosure may also be a computer program that causes a computer to execute each characteristic step included in the information processing method. An aspect of the present disclosure may also be a non-transitory computer-readable recording medium having such a computer program recorded thereon.

Although the present disclosure has been described and illustrated in detail, it is clearly understood that the same is by way of example only and is not to be taken by way of limitation, the scope of the present disclosure being limited only by the terms of the appended claims.

INDUSTRIAL APPLICABILITY

The present disclosure can be widely used in systems that perform information processing of training learning models.

What is claimed is:

1. An information processing method comprising, executed by one or more computers:
   acquiring first output data for input data of a first neural network, reference data for the input data, and second output data for the input data of a second neural network obtained by converting the first neural network, the second neural network performing a process with a lower numerical precision than a process performed by the first neural network;
   calculating (i) first difference data corresponding to a difference between the first output data and the reference data, (ii) second difference data corresponding to a difference between the second output data and the reference data, and (iii) third difference data corresponding to a difference between the first difference data and the second difference data;
   retraining the first neural network with use of the first difference data, the second difference data, and the third difference data; and
   replacing the second neural network with a new second neural network, the new second neural network being obtained by converting the retrained first neural network, and the new second neural network performing the process with the lower numerical precision,
   wherein the input data of the first neural network is an image including a subject to be recognized by the first neural network and the second neural network,
   wherein the first output data includes a first position of the subject in the image recognized by the first neural network,
   wherein the input data of the second neural network is the image,
   wherein the second output data includes a second position of the subject in the image recognized by the second neural network,
   wherein the retraining includes giving (i) a first weight to the first difference data, (ii) a second weight to the second difference data, and (iii) a third weight to the third difference data,
   wherein a sum of the first weight, the second weight, and the third weight is 1.0,
   wherein the first weight is greater than the second weight, and
   wherein the first neural network is retrained with use of the first weight, the first difference data, the second weight, the second difference data, the third weight, and the third difference data.

2. An information processing system comprising:
   a processor; and
   a non-transitory memory having stored therein executable instructions, which cause the processor to:
   acquire first output data for input data of a first neural network, reference data for the input data, and second output data for the input data of a second neural network obtained by converting the first neural network, the second neural network performing a process with a lower numerical precision than a process performed by the first neural network;
   calculate (i) first difference data corresponding to a difference between the first output data and the reference data, (ii) second difference data corresponding to a difference between the second output data and the reference data, and (iii) third difference data corresponding to a difference between the first difference data and the second difference data;

retrain the first neural network with use of the first difference data, the second difference data, and third difference data; and replace the second neural network with a new second neural network, the new second neural network being obtained by converting the retrained first neural network, and the new second neural network performing the process with the lower numerical precision, wherein the input data of the first neural network is an image including a subject to be recognized by the first neural network and the second neural network, wherein the first output data includes a first position of the subject in the image recognized by the first neural network, wherein the input data of the second neural network is the image, wherein the second output data includes a second position of the subject in the image recognized by the second neural network, wherein the retraining includes giving (i) a first weight to the first difference data, (ii) a second weight to the second difference data, and (iii) a third weight to the third difference data, wherein a sum of the first weight, the second weight, and the third weight is 1.0, wherein the first weight is greater than the second weight, and wherein the first neural network is retrained with use of the first weight, the first difference data, the second weight, the second difference data, the third weight, and the third difference data.

* * * * *